US010778135B2

United States Patent
Koenig et al.

(10) Patent No.: US 10,778,135 B2
(45) Date of Patent: Sep. 15, 2020

(54) MOTOR PARALLEL WINDING DIFFERENTIAL CURRENT PROTECTION

(71) Applicant: Hamilton Sundstrand Corporation, Charlotte, NC (US)

(72) Inventors: Andreas C. Koenig, Rockford, IL (US); Joseph Kenneth Coldwate, Roscoe, IL (US); Michael J. Menke, Roscoe, IL (US); Gary L. Miles, Stillman Valley, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/176,882

(22) Filed: Oct. 31, 2018

(65) Prior Publication Data

US 2020/0136550 A1 Apr. 30, 2020

(51) Int. Cl.
*G01R 31/02* (2006.01)
*H02H 3/04* (2006.01)
*H02H 7/08* (2006.01)
*H02P 29/024* (2016.01)
*H02P 25/22* (2006.01)

(52) U.S. Cl.
CPC ......... *H02P 29/027* (2013.01); *H02H 7/0844* (2013.01); *H02P 25/22* (2013.01); *B64D 2221/00* (2013.01)

(58) Field of Classification Search
CPC ...... H02P 29/027; H02P 25/22; H02H 7/0844
USPC .......................................... 318/490
See application file for complete search history.

(56) References Cited

U.S. PATENT DOCUMENTS

| 4,953,054 | A | 8/1990 | Fetzer et al. |
| 5,705,909 | A | 1/1998 | Rajashekara |
| 7,233,123 | B2 | 6/2007 | Koczara et al. |
| 7,253,634 | B1 * | 8/2007 | Kasztenny ........... H02H 1/0092 324/509 |

(Continued)

FOREIGN PATENT DOCUMENTS

| CA | 2071397 A1 | 3/1993 |
| EP | 3370335 A1 | 9/2018 |
| WO | 2016178667 A1 | 11/2016 |

OTHER PUBLICATIONS

Extended European Search Report for application No. 19206023.4-1202 dated Mar. 4, 2020, 9 pages.

*Primary Examiner* — Erick D Glass
(74) *Attorney, Agent, or Firm* — Cantor Colburn LLP (57) ABSTRACT

An electric motor control system, including an electric motor having a first winding set including first and second parallel windings, the first and second windings operable to each current based on the combined phase current, and a differential current sensor operably coupled to the first winding and the second winding. The differential current sensor measuring a differential current flowing through the first winding and the second winding and operable to transmit a signal indicative of the differential current based on the measuring. The system also includes a motor controller connected to the electric motor, the motor controller operable to direct the combined phase current through the phase lead, receive the differential current signal, determine if the differential current flowing through the winding set exceeds a selected threshold, and identify a health status of the motor winding set as degraded if the differential current exceeds the selected threshold.

19 Claims, 4 Drawing Sheets

(56) References Cited

U.S. PATENT DOCUMENTS

| | | | |
|---|---|---|---|
| 7,528,611 B2 | 5/2009 | Kasztenny et al. | |
| 7,646,160 B2 | 1/2010 | Chen et al. | |
| 8,810,189 B2 * | 8/2014 | Singh | G01R 31/42 318/400.21 |
| 9,018,881 B2 | 4/2015 | Mao et al. | |
| 2008/0080106 A1 | 4/2008 | Mirafzal et al. | |
| 2012/0229144 A1 | 9/2012 | Nakahara et al. | |
| 2014/0117912 A1 * | 5/2014 | Gajic | G01R 31/343 318/490 |
| 2016/0025811 A1 * | 1/2016 | Kasztenny | G01R 31/343 324/765.01 |
| 2016/0178699 A1 | 6/2016 | Schmaus et al. | |
| 2018/0254735 A1 | 9/2018 | Koenig et al. | |

* cited by examiner

MOTOR PARALLEL WINDING DIFFERENTIAL CURRENT PROTECTION

BACKGROUND

Exemplary embodiments pertain to the art of electric machines, and more particularly monitoring current flow in winding sets for electric machine.

Electric motors, are commonly used to convert electrical power into mechanical power to operate various devices on an aircraft. For example, 'more electric' aircraft architectures increasingly employ growing numbers of alternating current (AC) electric motors to operate devices traditionally powered hydraulically. Using such electric motors can aid in reducing weight and simplifying the arrangement of the aircraft. Such AC electric motors typically employ three-phase windings, which are provided AC power by the aircraft electrical system, and may operate at high frequency in cooperation with a motor controller.

In some applications it can be desirable to employ two or more winding sets for each AC phase in the electric motor. The winding sets are generally connected in parallel with one another to reduce winding resistance and inductance to limit electrical losses and to improve operation of the electric motor at high frequencies. The parallel winding sets are typically fed by a common phase lead, which connects the parallel phase leads to the AC power bus source lead through a motor controller. Current flow through the winding sets is generally measured at the phase lead and provided to the motor controller for monitoring current flow through the winding sets for each phase of the motor.

Occasionally, one of the windings in the motor may degrade or fail. Such degradation or failure can result in the currents in the three phases of the electric motor becoming unbalanced. Generally an imbalance in phase currents is detected by the motor controller and can result in a motor controller trip to an offline condition and loss of operation of the electric motor. In some cases, with certain winding degradation or failure, the phase currents may remain sufficiently balanced for the motor controller to continue operating the motor at lower power levels without tripping the offline condition. This occurs because the undamaged phase leg of the parallel windings accepts additional current to compensate for the degraded or damaged parallel phase winding. Unfortunately, under such a condition the failure remains partially masked such that the motor controller may not detect the failure, causing the losses in the remaining parallel winding to be higher and thereby reducing the life of that portion of the motor.

Such conventional methods and systems have generally been considered satisfactory for their intended purpose. However, there is still a need in the art for improved current sensing in electric motors.

BRIEF DESCRIPTION

Disclosed is an electric motor control system, including an electric motor having a first winding set including first and second parallel windings, the first and second windings operable to carry a total current based on the combined phase current, and a current sensor operably coupled to the first winding and the second winding. The current sensor measuring a differential current flowing through the first winding and the second winding and operable to transmit a signal indicative of the differential current based on the measuring. The system also includes a motor controller connected to the electric motor, the motor controller operable to direct the combined phase current through the phase lead, receive the differential current signal, determine if the differential current flowing through the winding set exceeds a selected threshold, and identify a health status of the motor winding set as degraded or operate in a reduced performance mode "Limp mode" if the differential current exceeds the selected threshold.

In addition to one or more of the features described above, or as an alternative, further embodiments may include that the electric motor is a multiphase electric machine and the phase lead corresponds to a first phase of a plurality of phases.

In addition to one or more of the features described above, or as an alternative, further embodiments may include a second phase lead corresponding to a second phase of the plurality of phases, the second phase lead operable to carry a second combined phase current.

In addition to one or more of the features described above, or as an alternative, further embodiments may include a second winding set corresponding to a second phase of the plurality of phases, the second winding set including third winding carrying a third current and a fourth windings carrying a fourth current connected to the second phase lead, the third winding connected in parallel with the fourth winding, the third current and the fourth current based on the second combined phase current.

In addition to one or more of the features described above, or as an alternative, further embodiments may include a second differential current sensor operably coupled to the third winding and the fourth winding, the differential current sensor measuring a second differential current based on the third current flowing through the third winding and the fourth current flowing through the fourth winding and operable to transmit a signal indicative of the second differential current based on the measuring.

In addition to one or more of the features described above, or as an alternative, further embodiments may include that the second winding set extends between the electric motor and the motor controller.

In addition to one or more of the features described above, or as an alternative, further embodiments may include that the first winding set extends between the electric motor and the motor controller.

In addition to one or more of the features described above, or as an alternative, further embodiments may include a current sensor operably connected to the phase lead, the current sensor operable to measure the combined phase current.

In addition to one or more of the features described above, or as an alternative, further embodiments may include that the first selected threshold is based at least in part on the combined phase current, a total current supplied to the motor, a thermal capability of the motor, a loss exhibited as a result of an imbalance between the first winding and the second winding.

In addition to one or more of the features described above, or as an alternative, further embodiments may include that the first selected threshold is based on a percentage of the combined phase current.

In addition to one or more of the features described above, or as an alternative, further embodiments may include the controller decreasing current flow through at least one of the first winding and the second winding in response to identifying the health status of the electric machine as degraded or compromised.

Also described herein in another embodiment is an electric motor. The electric motor includes an electric motor having a phase lead operable to carry a combined phase current and a first winding set including first and second windings connected to the phase lead, the second winding connected in parallel with the first winding, and where the first and second windings operable to carry a first current and a second current respectively, based on the combined phase current. The electric motor also includes a differential current sensor operably coupled to the first winding and the second winding, the differential current sensor measuring a differential current based on the first current and the second current flowing through the first winding and the second winding and operable to transmit a signal indicative of the differential current based on the measuring.

In addition to one or more of the features described above, or as an alternative, further embodiments of the electric motor may include that the electric motor is a multiphase electric machine and the phase lead corresponds to a first phase of a plurality of phases.

In addition to one or more of the features described above, or as an alternative, further embodiments of the electric motor may include a second phase lead corresponding to a second phase of the plurality of phases, the second phase lead operable to carry a second combined phase current.

In addition to one or more of the features described above, or as an alternative, further embodiments of the electric motor may include a second winding set corresponding to a second phase of the plurality of phases, the second winding set including third winding carrying a third current and a fourth windings carrying a fourth current connected to the second phase lead, the third winding connected in parallel with the fourth winding, the third current and the fourth current based on the second combined phase current.

In addition to one or more of the features described above, or as an alternative, further embodiments of the electric motor may include a second differential current sensor operably coupled to the third winding and the fourth winding, the differential current sensor measuring a second differential current based on the third current flowing through the third winding and the fourth current flowing through the fourth winding based on the second combined phase current and operable to transmit a signal indicative of the second differential current based on the measuring.

Also described herein in yet another embodiment is a method operating an electric machine having a parallel winding set. The method includes controlling, by a motor controller, a combined current and directing a first current through a first winding and a second current through a second winding of the parallel winding set, the first current and the second current based on the combined current and sensing a differential current flow between the first current in the first winding and the second current in the second winding of the parallel winding set. The method also includes determining if the differential current exceeds a first selected threshold and identifying the health status of the electric machine as degraded or failed if the differential current exceeds the first selected threshold.

In addition to one or more of the features described above, or as an alternative, further embodiments of the method may include decreasing current flow through at least one of the first winding and the second winding in response to determining the health status of the electric machine is degraded or failed.

In addition to one or more of the features described above, or as an alternative, further embodiments may include that the electric motor is a multiphase electric machine and the phase lead corresponds to a first phase of a plurality of phases.

In addition to one or more of the features described above, or as an alternative, further embodiments of the method may include controlling, by the motor controller, a second combined current and directing a third current through a third winding and a fourth current through a fourth winding of a second parallel winding set, the third current and the fourth current based on the second combined current, and sensing a second differential current flow between third current in the third winding and the fourth current in the fourth winding of the second parallel winding set. Moreover the further embodiments may also include determining if the second differential current exceeds a second selected threshold and identifying the health status of the electric machine as degraded or failed if the second differential current exceeds the second selected threshold.

In addition to one or more of the features described above, or as an alternative, further embodiments of the method may include decreasing current flow through at least one of the third winding and the fourth winding in response to determining the health status of the electric machine is degraded or failed.

In addition to one or more of the features described above, or as an alternative, further embodiments may include that the second selected threshold is based on selected threshold is based at least in part on the combined phase current, a total current supplied to the motor, a thermal capability of the motor, a loss exhibited as a result of an imbalance between the third winding and the fourth winding.

In addition to one or more of the features described above, or as an alternative, further embodiments may include that the first selected threshold is based on a percentage of the combined phase current.

In addition to one or more of the features described above, or as an alternative, further embodiments may include that the first selected threshold is based on selected threshold is based at least in part on the combined phase current, a total current supplied to the motor, a thermal capability of the motor, a loss exhibited as a result of an imbalance between the first winding and the second winding.

Embodiments of the present disclosure include a motor control system with a motor having paralleled windings that include current sensors that measure differential currents within parallel phase windings of the motor attached thereto. A technical effect of such embodiments is that the differential current sensors can identify any difference in currents to the parallel windings for each phase of the winding and thereby identify a potential degradation of the motor windings or a fault condition.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures wherein like reference numerals identify similar structural features or aspects of the subject disclosure.

Figure 1:
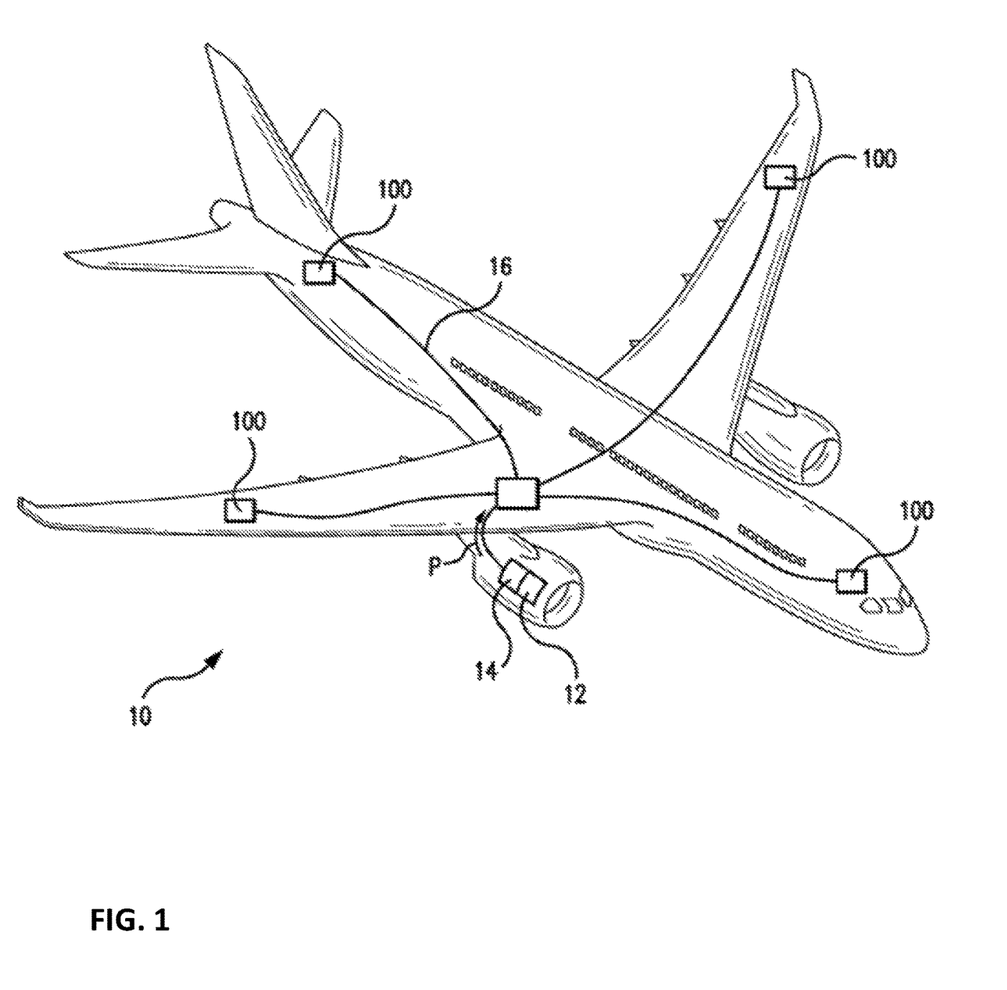
FIG. 1 is a diagram, showing an aircraft power distribution system in communication with an electric machine.

For purposes of explanation and illustration, and not limitation, a partial view of an exemplary embodiment of an electric machine in accordance with the disclosure is shown in FIG. 1 and is designated generally by reference character 100. Other embodiments of electric machine and methods of monitoring current flow within winding sets in accordance with the disclosure, or aspects thereof, are provided in FIGS. 2-4, as will be described. The systems and methods described herein can be used sensing current flow through parallel winding sets in electric machine in aircraft, though the present disclosure is not limited to aircraft applications.

As will be appreciated by those of skill in the art in view of the present disclosure, current flow between parallel phase windings in some types of motors can become unbalanced, compromising the health of the electric machine. For example, resistance changes such as due to a short or open in one of the parallel windings can cause current flow through one of the parallel windings to be greater than current flow through the other, leading to current flow imbalance between the parallel leads. Since current flow at the phase lead can remain unchanged notwithstanding the imbalance, current measurement at the phase lead can be slow to recognize or miss entirely the imbalance, potentially allowing the current imbalance to stress the winding disproportionately burdened by the current imbalance.

Referring to FIG. 1, an aircraft 10 is shown. Aircraft 10 includes an engine 12, a generator electric machine 14, a power distribution system 16, and one or more motors 100, e.g., a motor electric machine. The engine 12 is operably connected to the generator electric machine 14. The generator electric machine 14 is arranged to generate electrical power (P) using mechanical power received from the engine 12. The power is provided to the power distribution system 16, which connects the generator electric machine 14 to the motor 100 and provides the electrical power P thereto. While a current sensing arrangement for motor 100 is described herein in the following exemplary embodiments, it is to be understood and appreciated the described current sensing arrangement can also be applied to a generator electric machine, e.g., generator electric machine 14.

Figure 2:
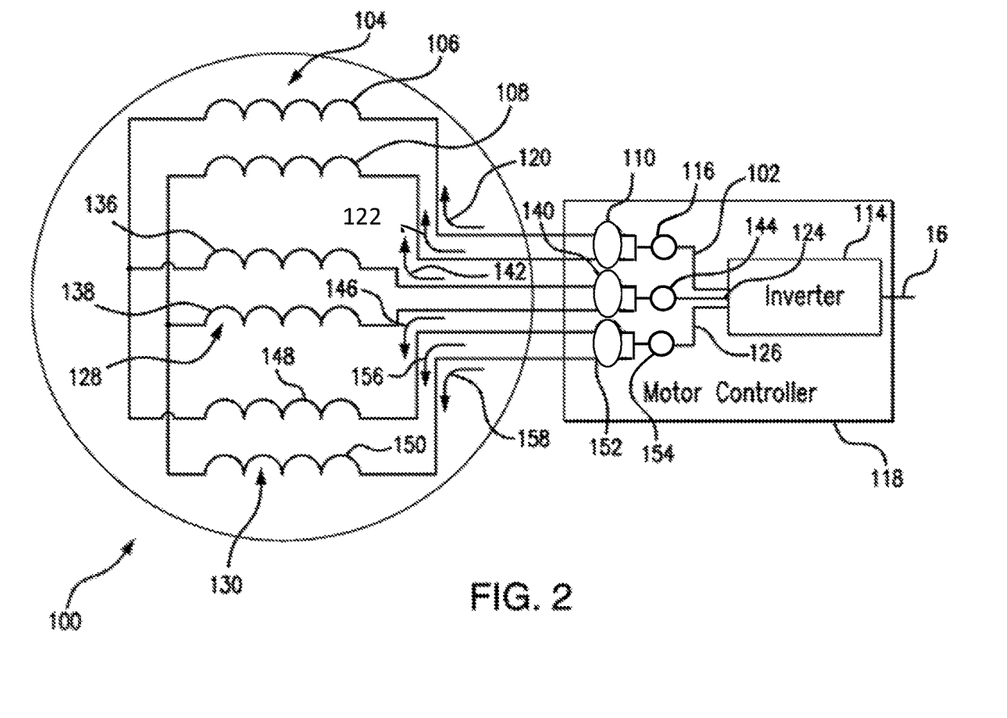
FIG. 2 is a schematic view of an embodiment of the electric machine of FIG. 1, showing current sensors coupled to winding sets of the electric machine within a motor controller.

With reference to FIG. 2, a motor 100 is shown. The motor 100 includes a phase lead 102 and a winding set 104. The winding set 104 has a first winding 106 and a second winding 108 that are each connected to phase lead 102. The second winding 108 is connected electrically in parallel with first winding 106. A differential current sensor 110 is coupled to first winding 106 and the second winding 108 and is arranged to measure the difference in currents flowing through first winding 106 and the second winding 108.

To recognize when the health of electric machines, e.g., motor 100, may have been compromised, the motor 100 includes parallel windings that extend out of the motor 100 and into the motor controller 118, wherein they couple to a single phase lead e.g., 102. This allows for placement of differential current sensors e.g., 110, directly on the parallel winding leads, where they can directly measure differential current flow through the parallel windings e.g., 106, 108 instead of relying on inferential measurements obtained from the combined current sensor 116 on phase lead 102 or individual current sensors associated with each parallel winding.

In the illustrated exemplary embodiment phase lead 102 is an A-phase lead and winding set 104 is an A-phase winding set. The A-phase lead 102 is connected to an inverter 114, which is arranged to provide AC power to the A-phase lead 102. The A-phase winding set 104 includes an A-phase first winding 106, an A-phase second winding 108, an A-phase differential current sensor 110, and an A-phase combined current sensor 116. The A-phase first current sensor 110 and the A-phase combined current sensor 116 are communicative with the motor controller 118, the A-phase differential current sensor 110 being coupled to the A-phase first winding 106 and A-phase second winding 108 to provide an A-phase differential current signal 112 (See FIG. 3) to the motor controller 118 and an A-phase combined current sensor 116 being coupled to the A-phase lead 102 to provide an A-phase combined current signal 170 (FIG. 3) to the motor controller 118.

Motor controller 118 is operably connected to inverter 114 and arranged to control power, i.e., current flow, applied to the A-phase lead 102 based, at least in part, on current balance within the A-phase winding set 104. For example, the motor controller 118 can determine the combined current flow through the A-phase lead 102 based on the A-phase combined current sensor 116, and/or simply monitor the differential of the current flow 120 through the A-phase first winding 106 and the current flow 122 through the A-phase second winding 108 based on an A-phase differential current as measured by the a-phase differential current sensor 110. Based on the measured differential current, the motor controller 118 can change the power applied to A-phase lead 102. For example, the motor controller 118 can reduce the power applied to A-phase winding set 104 when the differential current flow between A-phase first winding 106 and A-phase second winding 108 is outside of predetermined range, or level. Notably, the winding set can extend from the motor 100 into motor controller 118 such that each current sensor (e.g., 110, 116) can be housed within the motor controller 118, with each of the six windings (e.g., 106, 108, 136, 138, 148, and 150) entering motor controller 118 for current measurement and connection to phase leads 102, 124, and 126, which terminate within motor controller 118. It should be appreciated that while the disclosed embodiments are described with respect to the six motor windings (e.g., 106, 108, 136, 138, 148, and 150) extending into the motor controller 118, such configuration is for illustration purposes only. It should be understood that other configurations are possible including one in which the six leads and the differential current sensors 110, 140, and 152 are installed in the motor 100.

Continuing with FIG. 2, as shown in the illustrated embodiment, the motor 100 is a three-phase AC power motor with parallel winding sets (e.g., 104, 128, 130 for phases A, B, and C respectively). In this respect, motor 100 also includes a B-phase lead 124, a C-phase lead 126, a B-phase winding set 128, and a C-phase winding set 130. The B-phase lead 124 and the C-phase lead 126 are connected to inverter 114, the B-phase lead 124 receiving B-phase AC power from the inverter 114 and the C-phase lead 126 receiving C-phase AC power from the inverter 114.

The B-phase winding set 128 includes a B-phase first winding 136, a B-phase second winding 138, a B-phase differential current sensor 140. The B-phase second winding 138 is connected in parallel with the B-phase first winding 136. The B-phase differential current sensor 140 is differentially coupled to the B-phase first winding 136 and the B-phase second winding 138 and is communicative with the motor controller 118 for providing a B-phase differential current signal 172 indicative of the differential between the current 142 flowing in the B-phase first winding 136 and the current 146 flowing through the B-phase second winding 138. The B-phase combined current sensor 144 is coupled to the B-phase lead 124 and is communicative with the motor controller 118 for providing a signal indicative of the total current flowing through the B-phase lead 124 to/from the motor controller 118.

The C-phase winding set 130 includes a C-phase first winding 148, a C-phase second winding 150, a C-phase differential current sensor 152, and a C-phase combined current sensor 154. The C-phase second winding 150 is connected in parallel with the C-phase first winding 148. The C-phase differential current sensor 152 is coupled to the C-phase first winding 148 and the C-phase second winding 150 and is communicative with the motor controller 118. The C-phase differential currents sensor 152 provides a signal to the motor controller 118 indicative of the difference between the current 156 flowing through the C-phase first winding 148 and the current 158 flowing through the C-phase second winding 150. The C-phase combined current sensor 154 is coupled to the C-phase lead 126 and is communicative with the motor controller 118 for providing a signal indicative of the combined current flowing through the C-phase lead 126 to/from the motor controller 118.

Figure 3:
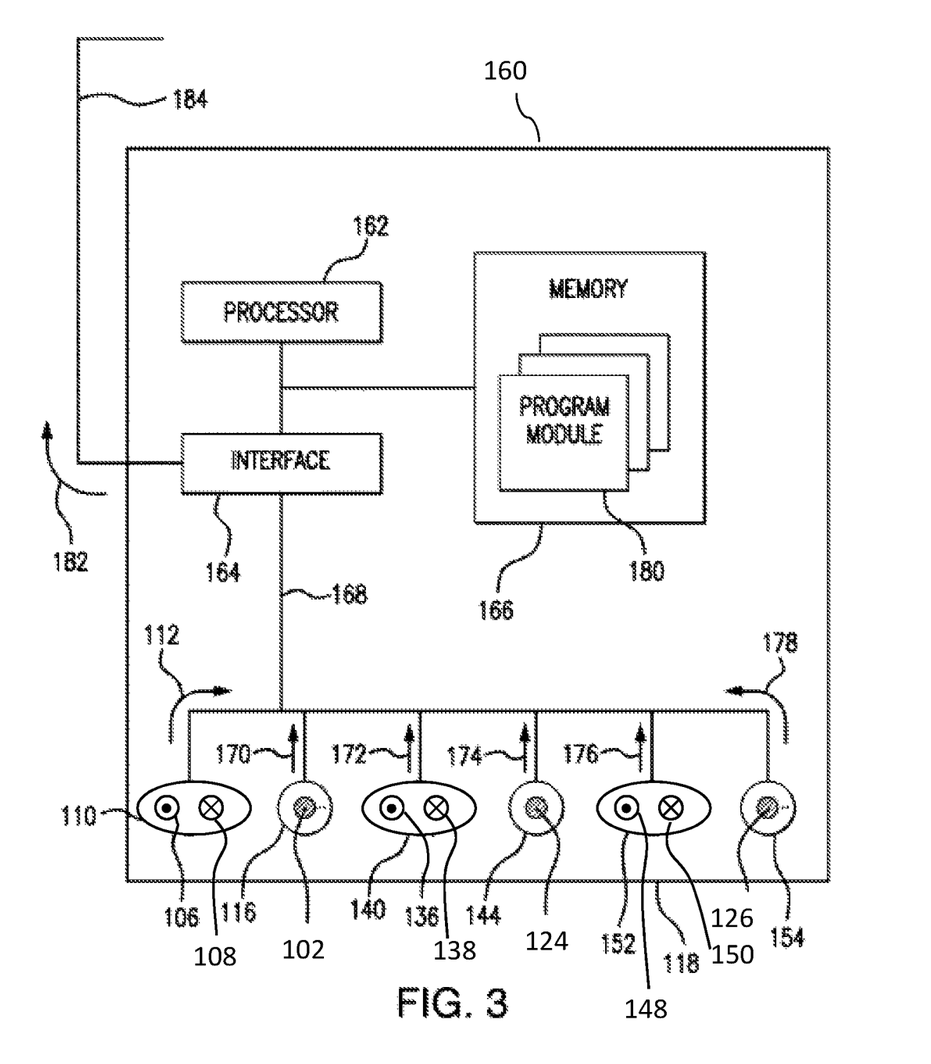
FIG. 3 is a schematic view of the motor controller of FIG. 2, showing current sensors inductively coupled to windings of the electric machine providing signals of current flow through parallel phase windings of the electric machine within the motor controller.

With reference to FIG. 3, an example of a motor controller 118 is shown. The motor controller 118 includes a housing 160, processor 162, an interface 164, a memory 166, and a communications link 168. Each of the parallel phase windings, e.g., A-phase first winding 106, A-phase second winding 108, B-phase first winding 136, B-phase second winding 138, C-phase first winding 148, and C-phase second winding 150, extend from the motor 100 (shown in FIG. 1) and into an interior of housing 160, where they electrically connect with respective the phase leads, e.g., A-phase lead 102 (shown in FIG. 2), B-phase lead 124 (shown in FIG. 2), and C-phase lead 126 (shown in FIG. 2).

The differential current sensors 110, 140, and 152 inductively couple to each of the of the parallel windings sets (e.g., 104, 128, and 138) within the interior of housing 160 for providing signals indicative of the differential current flow through the respective winding sets 104, 128, and 130. In this respect, the A-phase differential current sensor 110 inductively couples to the A-phase first winding 106 to and to the A-phase second winding 108, the B-phase differential current sensor 140 inductively couples to the B-phase first winding 136 and to the B-phase second winding 138. Likewise, the C-phase differential current sensor 152 inductively couples to the C-phase first winding 148 and to the C-phase-phase second winding 150 It should be noted that while FIG. 2 depicts the currents for each of the first winding 106 and the second winding 108 (for Phase-A) flowing in the same direction, the depiction is for simplification only. Differential current sensors 110, 140, and 152 may also have the currents for each of the first winding 106 and second winding 108 (for Phase-A) flowing in opposite directions as depicted in FIG. 3. Such depiction and configuration is only dependent on the particular configuration and polarization of the types of differential current sensor(s) 110, 140, and 152 employed.

Similarly, the combined current sensors 116, 144, and 154 inductively couple to each of the phase legs within the interior of housing 160 for providing signals indicative of the combined current flow through each respective phase lead 102, 124, and 126. In this respect, the A-phase combined current sensor 116 inductively couples to the A-phase lead 102, the B-phase combined current sensor 144 inductively couples to the B-phase lead 124, and the C-phase combined current sensor 154 inductively couples to the C-phase lead 126.

Each of the differential current sensors 110, 140, and 152 as well as combined current sensors 116, 144, and 154 provides a signal indicative of respective differential current flow or combined current flow to communications link 168. In this respect, A-phase differential current sensor 110 reports differential current flow through the A-phase first winding 106 and the A-phase second winding 108 via A-phase differential current signal 112 provided to communications link 168. In addition, the A-phase combined current sensor 116 reports current flow through the A-phase lead 102 via an A-phase combined current signal 170, which are provided to communications link 168. Similarly, the B-phase differential current sensor 140 reports differential current flow through the B-phase first winding 136 and the B-phase second winding 138 via a B-phase differential current signal 172 provided to communications link 168. In addition, the B-phase combined current sensor 144 reports current flow through the B-phase lead 124 via the B-phase combined current signal 174, which are also provided to communications link 168. Finally, the C-phase differential current sensor 152 reports differential current flow through the C-phase first winding 148 and the C-phase second winding 150 via a C-phase differential current signal 176 provided to communications link 168, and likewise, the C-phase combined current sensor 154 reports current flow through the C-phase lead 126 via a C-phase combined current signal 178, which are additionally provided to the communications link 168.

Communications link 168 provides the current signals 112, 170, 172, 174, 176, and 178 to processor 162 via interface 164. Processor 162 is disposed in communication with interface 164 and memory 166. Memory 166 has a plurality of program modules 180 recorded thereon that, when read by processor 162, cause processor 162 to execute certain operations, e.g., determine differential current exceedances between pairs of parallel windings e.g., 106, 108 in a phase winding set e.g., 104. In this respect processor 162 receives A-phase differential current signal 112 and A-phase combined current signal 170, evaluates the differential current when compared to a selected threshold, and determines health of motor 100 (shown in FIG. 2) based on the level differential current flow through the respective winding sets (e.g., 104, 128, 130). This can include comparing the determined differential current(s) to one or more selected thresholds as may be recorded on memory 166 by way of non-limiting example. In this manner differential currents can be evaluated and potential motor faults can be determined for each of the windings sets (e.g., 104, 128, 130) within motor 100.

In an embodiment, when the comparison indicates that differential current between the parallel windings e.g., 106, 108 of the winding set (e.g., 104, 128, 130) is within a selected threshold, processor 162 deems the phase set (e.g., 104, 128, 130) healthy. When the comparison indicates that differential current between the parallel windings of the winding set (e.g., 104, 128, 130) is not within the selected threshold processor 162 deems motor 100 unhealthy. A health status report, and or warning report 182, can be issued by processor 162 via a communications link 184 to an electrical system manager, aircraft control system, warning to the pilot and the like. Countermeasures can also be taken, such as by shutting down or de-rating motor 100 to reduce current flow through the impacted parallel windings or winding set (e.g., 104, 128, 130), thereby avoiding any significant current imbalance between parallel windings (e.g., 106 and 108 for Phase A) to damage motor 100.

Figure 4:
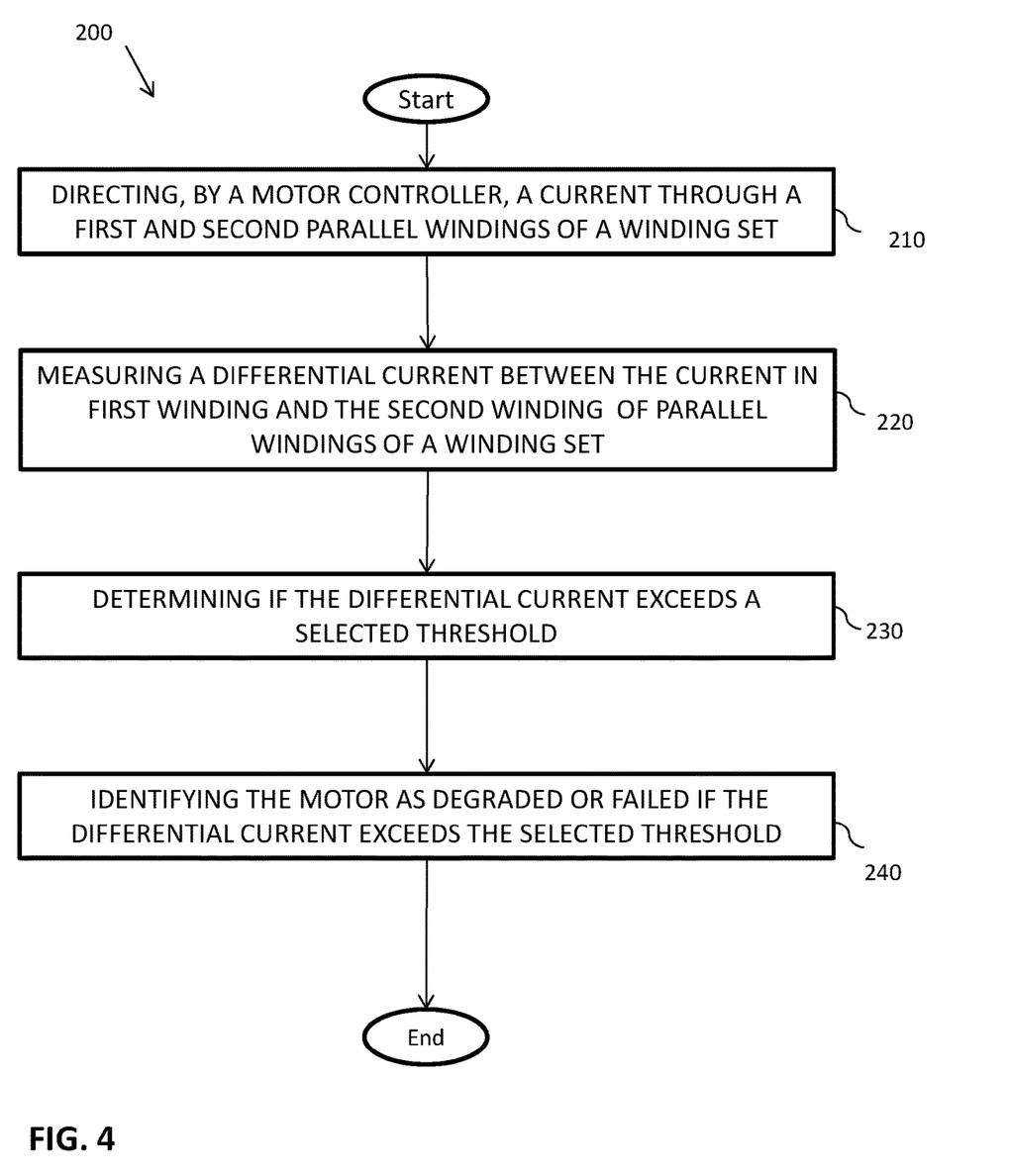
FIG. 4 process flow chart of a method of sensing current flow in an electric machine, showing steps of the method in accordance with an embodiment.

With reference to FIG. 4, a method 200 of monitoring current flow in an electric machine, e.g., motor 100 (shown in FIG. 2), is shown. Method 200 includes flowing current through first and second parallel windings, e.g., A-phase first winding 106 (shown in FIG. 2) and second phase second winding 108 (shown in FIG. 2), in a winding set (e.g., 104, 128, 130), as depicted with process step 210. Differential current flow through the first winding e.g., 106, 136, and 148 and the second winding e.g., 108, 138, 150 is sensed using a differential current sensor(s) e.g., 110, 140, and 152 coupled to the first winding (e.g., 106, 136, and 148) and the second winding (e.g., 108, 138, 150), as shown at process step 220. The method 200 continues at process step 230 with determining if the measured differential current exceeds a selected threshold. In an embodiment, the threshold may be based at least in part on the phase currents, the total current supplied, the thermal capability of the motor, inherent losses exhibited as a result of an imbalance, and the like. In an embodiment, the threshold is about 10% differential current relative to the combined phase current. In another embodiment the threshold may be about 5% differential current relative to the combined phase current.

Continuing with FIG. 4, in an embodiment, if the differential current exceeds the selected threshold, the status regarding the electric machine, e.g., motor 100 is identified as degraded or failed as depicted at process step 240. In an embodiment, the health of the electric machine is identified as degraded, the motor controller 118 may continue operating the electric machine, e.g., motor 100 at a reduced power or remove the motor 100 from operation. In an embodiment if the comparison indicates that the differential current for a given winding set (e.g., 104, 128, 130), is within the predetermined threshold, monitoring continues as the process reiterates.

The methods and systems of the present disclosure, as described above and shown in the drawings, provide for electric machines with superior properties including the capability to identify differential currents indicating changes in motor winding characteristics such as resistance changes in a phase winding that could otherwise lead to current overload in the parallel phase winding motors.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric motor control system, comprising:
   an electric motor having a phase lead operable to carry a combined phase current and a first winding set including first and second windings connected to the phase lead, the second winding connected in parallel with the first winding, the first and second windings operable to carry a first current and a second current respectively, based on the combined phase current;
   a differential current sensor operably coupled to the first winding and the second winding, the differential current sensor measuring a differential current based on the first current and the second current flowing through the first winding and the second winding and operable to transmit a signal indicative of the differential current based on the measuring; and
   a motor controller connected to the electric motor, the motor controller configured to:
   control the combined phase current through the phase lead;
   receive the signal indicative of the differential current from the differential current sensor;
   determine if the differential current flowing through the first winding and the second winding exceeds a selected threshold; and
   identify a health status of the motor winding set as degraded or faulted if the differential current exceeds the selected threshold.

2. The electric motor control system of claim 1, further including the electric motor is a multiphase electric machine and the phase lead corresponds to a first phase of a plurality of phases.

3. The electric motor control system of claim 2, further including a second phase lead corresponding to a second phase of the plurality of phases, the second phase lead operable to carry a second combined phase current.

4. The electric motor control system of claim 3, further including a second winding set corresponding to a second phase of the plurality of phases, the second winding set including third winding carrying a third current and a fourth windings carrying a fourth current connected to the second phase lead, the third winding connected in parallel with the fourth winding, the third current and the fourth current based on the second combined phase current.

5. The electric motor control system of claim 4, further including a second differential current sensor operably coupled to the third winding and the fourth winding, the differential current sensor measuring a second differential current based on the third current flowing through the third winding and the fourth current flowing through the fourth winding and operable to transmit a signal indicative of the second differential current based on the measuring.

6. The electric motor control system of claim 5, wherein the second winding set extends between the electric motor and the motor controller.

7. The electric motor control system of claim 1, wherein the first winding set extends between the electric motor and the motor controller.

8. The electric motor control system as recited in claim 1, further including a current sensor operably connected to the phase lead, the current sensor operable to measure the combined phase current.

9. The electric motor control system as recited in claim 1, wherein the first selected threshold is based at least in part on the combined phase current, a total current supplied to the motor, a thermal capability of the motor, a loss exhibited as a result of an imbalance between the first winding and the second winding.

10. The electric motor control system as recited in claim 1, wherein the first selected threshold is based on a percentage of the combined phase current.

11. The electric motor control system as recited in claim 1, further comprising the controller decreasing current flow through at least one of the first winding and the second winding in response to identifying the health status of the electric machine as degraded or compromised.

12. A method operating an electric machine having a parallel winding set, comprising:
controlling, by a motor controller, a combined current and directing a first current through a first winding and a second current through a second winding of the parallel winding set, the first current and the second current based on the combined current;
sensing a differential current flow between the first current in the first winding and the second current in the second winding of the parallel winding set;
determining if the differential current exceeds a first selected threshold;
identifying the health status of the electric machine as degraded or failed if the differential current exceeds the first selected threshold.

13. The method of operating an electric machine of claim 12, further comprising decreasing current flow through at least one of the first winding and the second winding in response to determining the health status of the electric machine is degraded or failed.

14. The method of operating an electric machine of claim 12, wherein the electric motor is a multiphase electric machine and the phase lead corresponds to a first phase of a plurality of phases.

15. The method of operating an electric machine of claim 12, further including:
controlling, by the motor controller, a second combined current and directing a third current through a third winding and a fourth current through a fourth winding of a second parallel winding set, the third current and the fourth current based on the second combined current;
sensing a second differential current flow between third current in the third winding and the fourth current in the fourth winding of the second parallel winding set;
determining if the second differential current exceeds a second selected threshold; and
identifying the health status of the electric machine as degraded or failed if the second differential current exceeds the second selected threshold.

16. The method of operating an electric machine of claim 15, further comprising decreasing current flow through at least one of the third winding and the fourth winding in response to determining the health status of the electric machine is degraded or failed.

17. The method of operating an electric machine of claim 15, wherein the second selected threshold is based on selected threshold is based at least in part on the combined phase current, a total current supplied to the motor, a thermal capability of the motor, a loss exhibited as a result of an imbalance between the third winding and the fourth winding.

18. The method of operating an electric machine of claim 17, wherein the first selected threshold is based on a percentage of the combined phase current.

19. The method of operating an electric machine of claim 12, wherein the first selected threshold is based on selected threshold is based at least in part on the combined phase current, a total current supplied to the motor, a thermal capability of the motor, a loss exhibited as a result of an imbalance between the first winding and the second winding.

* * * * *